US009879786B2

(12) United States Patent
Kuwamura et al.

(10) Patent No.: US 9,879,786 B2
(45) Date of Patent: Jan. 30, 2018

(54) ROTARY MACHINE

(71) Applicant: MITSUBISHI HITACHI POWER SYSTEMS, LTD., Kanagawa (JP)

(72) Inventors: Yoshihiro Kuwamura, Tokyo (JP); Koichi Ishizaka, Tokyo (JP); Yoshiyuki Okabe, Tokyo (JP); Kazuyuki Matsumoto, Tokyo (JP); Hiroharu Oyama, Tokyo (JP); Hidekazu Uehara, Tokyo (JP); Yoshinori Tanaka, Tokyo (JP); Shin Nishimoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/418,231

(22) PCT Filed: Aug. 23, 2013

(86) PCT No.: PCT/JP2013/072537
§ 371 (c)(1),
(2) Date: Jan. 29, 2015

(87) PCT Pub. No.: WO2014/030734
PCT Pub. Date: Feb. 27, 2014

(65) Prior Publication Data
US 2015/0184750 A1 Jul. 2, 2015

(30) Foreign Application Priority Data
Aug. 23, 2012 (JP) .................................. 2012-184444

(51) Int. Cl.
*F01D 11/08* (2006.01)
*F16J 15/3292* (2016.01)
(Continued)

(52) U.S. Cl.
CPC .......... *F16J 15/3292* (2013.01); *F01D 5/225* (2013.01); *F01D 11/08* (2013.01); *F01D 11/127* (2013.01);
(Continued)

(58) Field of Classification Search
CPC   F16J 15/54; F16J 15/441; F16J 15/447; F16J 15/3288; F01D 11/08; F01D 5/225
See application file for complete search history.

(56) References Cited

U.S. PATENT DOCUMENTS 3,572,728 A * 3/1971 Smuland ....................... 277/419
4,161,318 A * 7/1979 Stuart et al. .................. 277/431
(Continued)

FOREIGN PATENT DOCUMENTS

CN      2735087       10/2005
CN      1737414       2/2006
(Continued)

OTHER PUBLICATIONS

International Search Report dated Sep. 17, 2013 in International Application No. PCT/JP2013/072537.
(Continued)

*Primary Examiner* — Eugene G Byrd
(74) *Attorney, Agent, or Firm* — Wenderoth, Lind & Ponack, L.L.P.

(57) ABSTRACT

A rotary machine includes turbine moving blades (50); a casing (10) covering the turbine moving blades (50) so as to define a gap at an outer circumferential side of the turbine moving blades; a leaf seal (70) having a seal body (71) that is disposed in the gap so as to protrude radially inward from the casing (10) and is capable of coming into contact with the turbine moving blades (50), and a high-pressure-side plate member (73) that is disposed along a face facing a high pressure side of the seal body (71); and a swirling flow
(Continued)

inhibitor (80) that is provided on the high pressure side of the leaf seal (70) in the gap and inhibits a swirl flow flowing through the gap in a circumferential direction.

6 Claims, 14 Drawing Sheets

(51) Int. Cl.
    *F16J 15/447*     (2006.01)
    *F16J 15/44*     (2006.01)
    *F01D 11/12*     (2006.01)
    *F15D 1/10*     (2006.01)
    *F01D 5/22*     (2006.01)

(52) U.S. Cl.
    CPC .............. *F15D 1/10* (2013.01); *F16J 15/444* (2013.01); *F16J 15/447* (2013.01); *F05D 2240/59* (2013.01)

(56) References Cited

U.S. PATENT DOCUMENTS

| | | | | |
|---|---|---|---|---|
| 4,420,161 | A * | 12/1983 | Miller | F01D 25/04 277/418 |
| 4,662,820 | A * | 5/1987 | Sasada et al. | 415/173.6 |
| 5,308,225 | A * | 5/1994 | Koff et al. | 415/57.3 |
| 5,318,309 | A | 6/1994 | Tseng et al. | |
| 5,586,859 | A * | 12/1996 | Nolcheff | 415/58.5 |
| 5,607,284 | A * | 3/1997 | Byrne et al. | 415/58.5 |
| 6,068,443 | A * | 5/2000 | Aoki et al. | 415/173.5 |
| 6,139,019 | A * | 10/2000 | Dinc et al. | 277/355 |
| 8,133,014 | B1 * | 3/2012 | Ebert et al. | 415/173.3 |
| 2003/0035715 | A1* | 2/2003 | Torrance | 415/58.5 |
| 2004/0223844 | A1* | 11/2004 | Farrell et al. | 415/170.1 |
| 2009/0243221 | A1* | 10/2009 | Olmes et al. | 277/411 |
| 2010/0143105 | A1* | 6/2010 | Goto et al. | 415/173.7 |
| 2011/0085892 | A1 | 4/2011 | John et al. | |
| 2012/0288360 | A1* | 11/2012 | Kuwamura et al. | 415/173.1 |
| 2012/0288361 | A1 | 11/2012 | Lu et al. | |
| 2012/0321449 | A1* | 12/2012 | Matsumoto et al. | 415/173.6 |
| 2013/0094945 | A1* | 4/2013 | Kuwamura et al. | 415/173.1 |
| 2013/0243600 | A1* | 9/2013 | Noble et al. | 416/204 R |
| 2013/0272888 | A1* | 10/2013 | Chouhan et al. | 416/223 R |
| 2014/0020403 | A1* | 1/2014 | Tsukuda et al. | 60/805 |
| 2014/0119901 | A1* | 5/2014 | Shibata et al. | 415/173.1 |

FOREIGN PATENT DOCUMENTS

| | | |
|---|---|---|
| CN | 1800589 | 7/2006 |
| CN | 1807846 | 7/2006 |
| CN | 2830648 | 10/2006 |
| CN | 101818664 | 9/2010 |
| CN | 102042043 | 5/2011 |
| CN | 102322529 | 1/2012 |
| CN | 102362109 | 2/2012 |
| CN | 102449268 | 5/2012 |
| EP | 2 249 066 | 11/2010 |
| GB | 2 333 137 | 7/1999 |
| JP | 10-196801 | 7/1998 |
| JP | 2005-308039 | 11/2005 |
| JP | 2006-52808 | 2/2006 |
| JP | 2006-104952 | 4/2006 |
| JP | 2007-120476 | 5/2007 |
| JP | 2008-121512 | 5/2008 |
| JP | 4088557 | 5/2008 |
| JP | 2008-184974 | 8/2008 |
| JP | 4146257 | 9/2008 |
| JP | 4213398 | 1/2009 |
| JP | 2009-243685 | 10/2009 |
| JP | 2009243685 A * | 10/2009 |
| JP | 2011-52645 | 3/2011 |
| JP | 2011-85138 | 4/2011 |
| JP | 2011106474 A * | 6/2011 |
| JP | 2011-174451 | 9/2011 |
| JP | 2012-137006 | 7/2012 |

OTHER PUBLICATIONS

Written Opinion of the International Searching Authority dated Sep. 17, 2013 in International Application No. PCT/JP2013/072537.
Office Action dated Jul. 3, 2015 in corresponding Chinese patent application No. 201380038661.7 (with English translation).
Extended European Search Report dated Jun. 29, 2016 in European patent application No. 13 830 717.8.
Office Action dated Jan. 12, 2016 in corresponding Chinese patent application No. 201380038661.7 (with English translation).

* cited by examiner

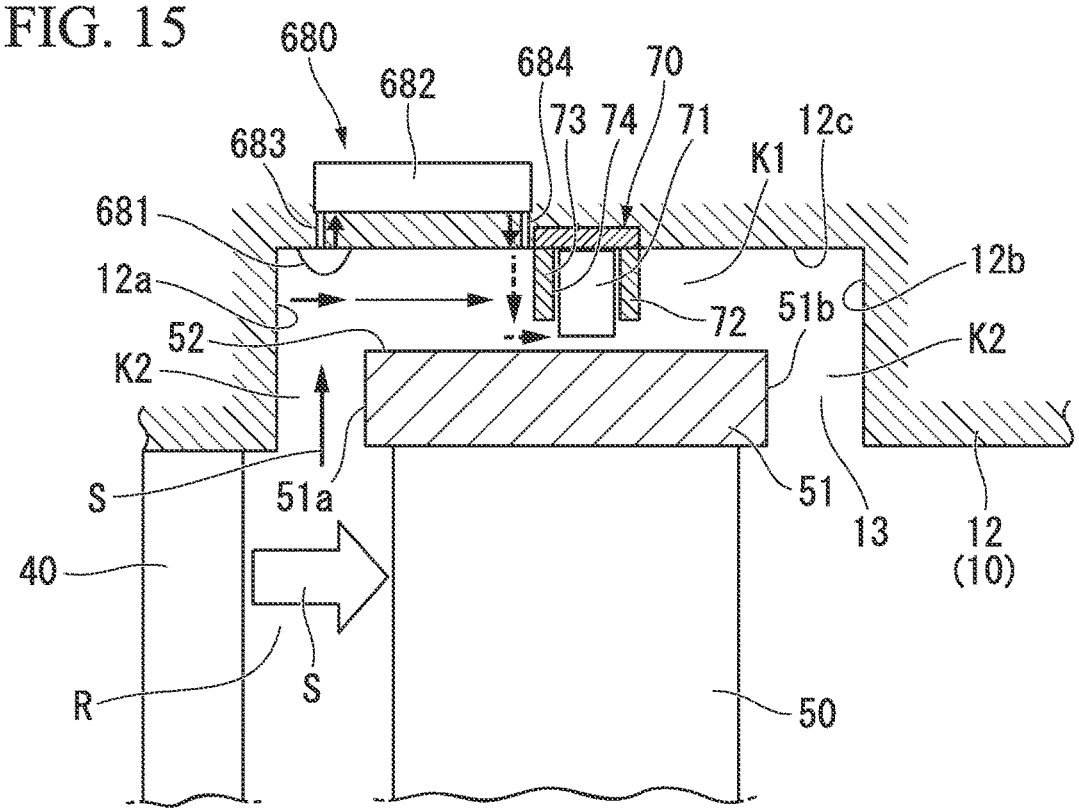

ROTARY MACHINE

BACKGROUND OF THE INVENTION

1. Technical Field

This invention relates to a rotary machine such as a turbine.

Priority is claimed on Japanese Patent Application No. 2012-184444, filed on Aug. 23, 2012, the contents of which are incorporated herein by reference.

2. Description of the Related Art

Rotary machines such as a turbine employ non-contact type seal mechanisms such as a labyrinth seal in order to prevent working fluid from leaking out of a potential gap between a stationary side and a rotating side.

However, when such a labyrinth seal is employed, the rotary machines should be configured to avoid coming into contact with a fin tip due to the process of self-induced vibration or thermal deformation, and thus it is difficult to further reduce a leakage rate of the working fluid.

In Japanese Unexamined Patent Application Publication No. 2005-308039, there is a proposal for a seal mechanism using a so-called leaf seal that is not capable of coming into contact with a rotating side. The seal mechanism using the leaf seal has a structure in which flat thin plates, having a predetermined width dimension in an axial direction of a rotational shaft, are disposed in multiple layers in a circumferential direction of the rotational shaft. The leaf seal has a tip that is in contact with the rotating side when stopped. The leaf seal slightly floats above the rotating side due to a dynamic pressure effect when rotated, and is not in contact with the rotating side. Since the tip of the leaf seal floats above the rotating side due to the dynamic pressure effect, a gap between the seal tip and the rotating side can be maintained even when self-induced vibration, thermal deformation or any other problem occurs at the rotating side when the leaf seal is rotated. In the case of the leaf seal, the gap between the seal tip and the rotating side can be sufficiently reduced compared to the gap of the labyrinth seal.

As a seal mechanism similar to the leaf seal, a brush type seal mechanism whose tip is in contact with a rotating side at all times is known. In the case of the brush type seal mechanism, since the tip thereof is always in contact with the rotating side, the leakage rate of working fluid can be reduced.

SUMMARY OF THE INVENTION

1. Problem to the Solved by the Invention

A so-called contact type seal mechanism such as the aforementioned leaf seal or the brush type seal has annular lateral plates mounted on high and low pressure sides. These lateral plates are mounted as supporting plates supporting the pressure in a direction in which the pressure acts. However, it has been known that the lateral plates have been damaged, for instance bent upward, when installed downstream from a member such as a stationary blade or a nozzle undergoing a strong swirl flow. When a strong swirl flow passes through a seal body such as a leaf or a brush, the swirl flow is directed in an axial direction. As such, the swirl flow becomes a circumferential load on the seal body, and the seal body may be damaged by circumferential deformation.

Accordingly, an object of this invention is to provide a rotary machine capable of preventing constituent members of a contact type seal mechanism from being damaged while reducing the leakage rate of working fluid.

2. Means for Solving the Problem

To solve the above-mentioned problem, this invention employs the following constitutions.

According to a first aspect of this invention, there is provided a rotary machine, which includes: a rotor; a stator configured to cover the rotor so as to define a gap at an outer circumference side of the rotor; a contact type seal configured to have a seal body, which is disposed in the gap so as to protrude radially inward from the stator and is capable of coming into contact with the rotor, and a high-pressure-side plate member disposed along a face facing a high pressure side of the seal body; and a swirl flow inhibitor provided at the high pressure side of the contact type seal in the gap and configured to inhibit a swirl flow of working fluid flowing through the gap in a circumferential direction.

According to a second aspect of the invention, in the rotary machine of the first aspect, the rotor may include a protrusion that guides the swirl flow into the gap of the high pressure side of the contact type seal such that the swirl flow comes into contact with the swirl flow inhibitor.

According to a third aspect of this invention, in the rotary machine of the second aspect, the swirl flow inhibitor may include a honeycomb seal disposed at a position opposite to the protrusion of the stator.

According to a fourth aspect of this invention, in the rotary machine of the first or second aspect, the swirl flow inhibitor may include a deflection plate changing a direction of the swirl flow in the stator.

According to a fifth aspect of this invention, in the rotary machine of any one of the first to fourth aspects, the swirl flow inhibitor may be disposed near the high-pressure-side plate member.

According to a sixth aspect of this invention, in the rotary machine of any one of the first to fifth aspects, the swirl flow inhibitor may include a recess that partly enlarges a high-pressure-side channel area of the contact type seal.

According to a seventh aspect of this invention, in the rotary machine of any one of the first to sixth aspects, the swirl flow inhibitor may include a protrusion that partly narrows the high-pressure-side channel area of the contact type seal.

According to an eighth aspect of this invention, in the rotary machine of any one of the first to seventh aspects, the swirl flow inhibitor may include an expansion chamber that recovers the swirl flow to reduce the dynamic pressure of the swirl flow, and the expansion chamber may inject the recovered working fluid to the vicinity of the high pressure side of the contact type seal using a static pressure of the working fluid.

3. Effects of the Invention

According to the aforementioned rotary machine, it is possible to prevent constituent members of a contact type seal mechanism from being damaged while reducing a leakage rate of working fluid.

BRIEF DESCRIPTION OF THE DRAWINGS

FIG. 15 is a view corresponding to FIG. 2 in a sixth embodiment of the invention.

DETAILED DESCRIPTION OF THE INVENTION

Hereinafter, a steam turbine that is a rotary machine of a first embodiment of this invention will be described based on the drawings.

Figure 1:
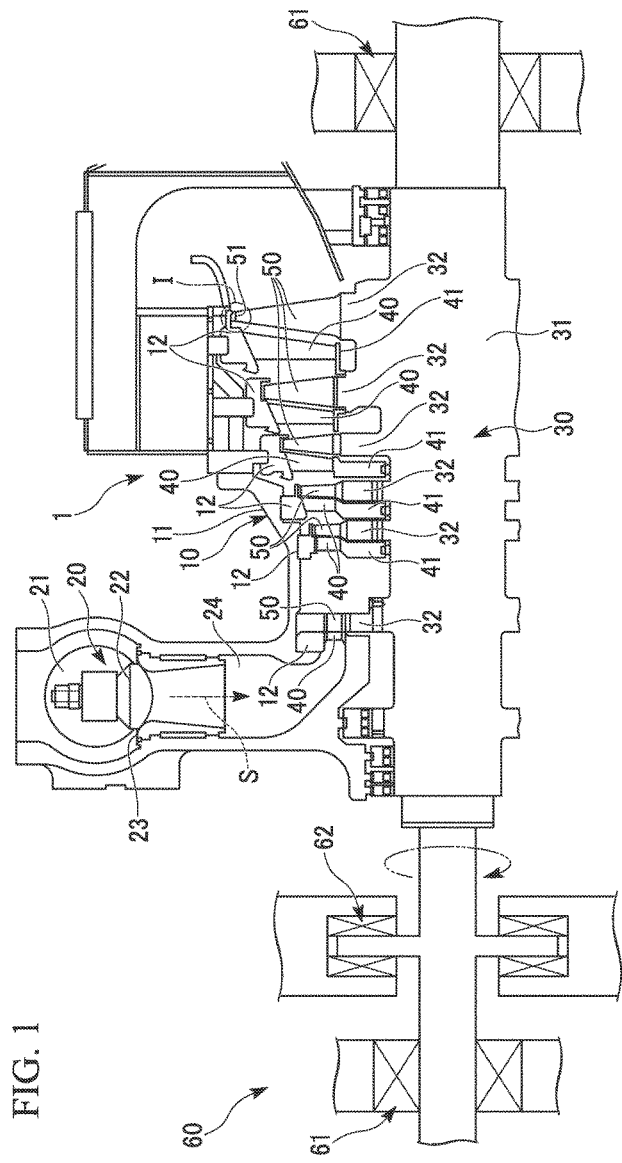
FIG. 1 is a constitutional view of a steam turbine in a first embodiment of the invention.

As shown in FIG. 1, the steam turbine 1 according to this embodiment includes a casing 10, regulating valves 20, a shaft 30, stationary blades 40, moving blades 50, and a bearing unit 60 that supports the shaft 30 so as to be rotatable about an axis of the shaft 30.

The regulating valve 20 regulates a quantity and pressure of steam S flowing into the casing 10.

The shaft 30 is rotatably installed inside of the casing 10. The shaft 30 transmits its power to a machine such as an electric generator (not shown).

The stationary blades 40 are held in the casing 10.

The moving blades 50 are provided on the shaft 30.

The bearing unit 60 supports the shaft 30 so as to be rotatable about an axis of the shaft 30.

The casing 10 is formed so as to airtightly seal its internal space. The casing 10 includes a body part 11 and diaphragm outer rings 12. The body part 11 defines a channel for the steam S. The diaphragm outer rings 12 are formed in a ring shape. The diaphragm outer rings 12 are firmly fixed to an inner wall surface of the body part 11.

The multiple regulating valves 20 are mounted in the body part 11 of the casing 10. Each regulating valve 20 includes a regulating valve chamber 21, a valve disk 22, a valve seat 23, and a steam chamber 24. The steam S flows from a boiler (not shown) into the regulating valve chambers 21. In the regulating valve 20, the valve disk 22 is separated from the valve seat 23, and thereby the steam channel is open. As a result, the steam S flows into the internal space of the casing 10 via the steam chamber 24.

The shaft 30 includes a shaft body 31 and multiple disks 32 extending radially outward from an outer circumference of the shaft body 31. The shaft 30 transmits rotational energy to the machine such as the electric generator (not shown).

The bearing unit 60 includes a journal bearing unit 61 and a thrust bearing unit 62. The bearing unit 60 rotatably supports the shaft 30, which is inserted inside the body part 11 of the casing 10, at an outer side of the body part 11.

The numerous stationary blades 40 are radially disposed so as to surround the circumference of the shaft 30. The disposed numerous stationary blades 40 constitute groups of annular stationary blades. The stationary blades 40 are respectively held on the aforementioned diaphragm outer rings 12. That is, the stationary blades 40 extend radially inward from the respective diaphragm outer rings 12.

Tips of the stationary blades 40 in an extending direction constitute a hub shroud 41. The hub shroud 41 is formed in a ring shape. The hub shroud 41 connects the multiple stationary blades 40 constituting the same annular stationary blade group. The shaft 30 is inserted into the hub shroud 41. The hub shroud 41 is arranged via a radial gap between the hub shroud 41 and the shaft 30.

The annular stationary blade groups, each of which is made up of the multiple stationary blades 40, are formed at intervals in an extending direction (hereinafter referred to as "an axial direction") of a rotational axis of the casing 10 or the shaft 30 and are formed into six groups. The annular stationary blade groups, each of which is made up of the multiple stationary blades 40, convert pressure energy of the steam S into speed energy, and guide the converted speed energy toward the moving blades 50 adjacent to an axial downstream side. The number of stationary blades 40 is not limited to six.

The moving blades 50 are firmly attached to outer circumferences of the disks 32 constituting the shaft 30, and extend radially outward from the shaft 30. The numerous moving blades 50 are radially disposed so as to constitute an annular moving blade group downstream from each annular stationary blade group.

The aforementioned annular stationary blade groups and the annular moving blade groups correspond to one another on a one-to-one basis. In detail, the steam turbine 1 has six stages. Tips of the moving blades 50 constitute a tip shroud 51 extending in a circumferential direction. The annular stationary blade groups and the number of annular moving blade groups are not limited to six.

Figure 2:
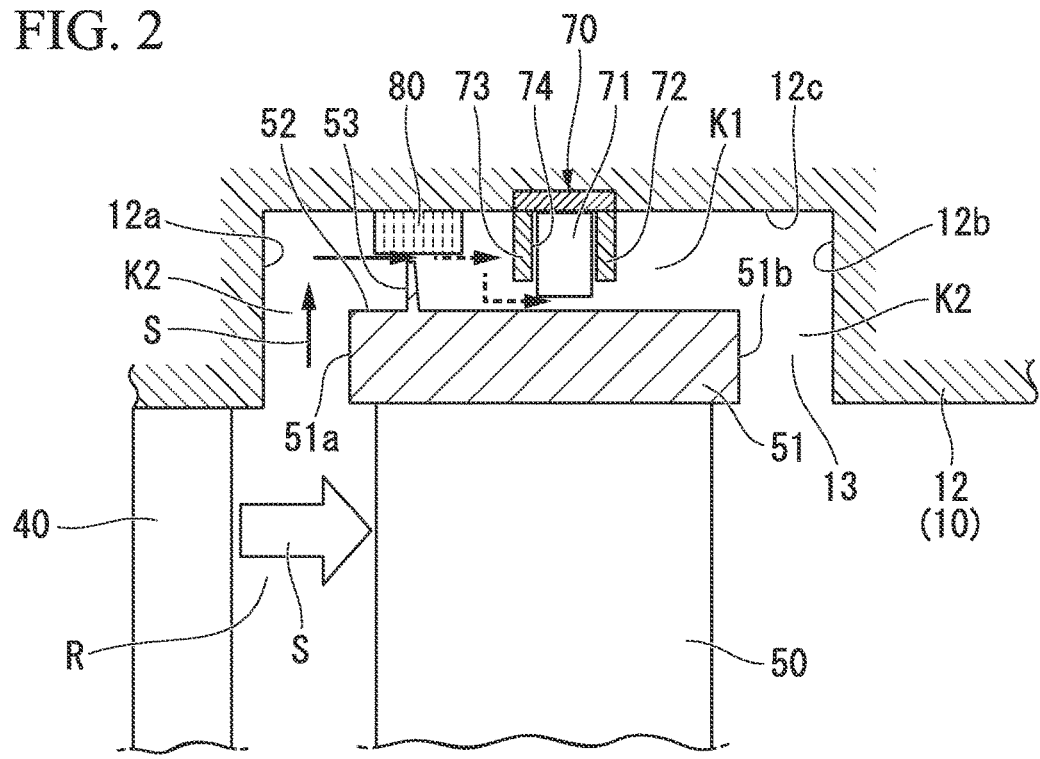
FIG. 2 is a schematic constitutional view showing a gap between moving blades and a casing in the steam turbine.

As shown in FIG. 2, the tip shroud 51 constituted of the tips of the moving blades 50 is disposed opposite to the diaphragm outer ring 12 of the casing 10. A gap (hereinafter referred to simply as a radial gap) K1 is formed between the tip shroud 51 and the casing 10 in a radial direction. The diaphragm outer ring 12 is disposed at an outer circumferential side of the tip shroud 51 so as to encircle the tip shroud 51. A leaf seal 70 is mounted on the diaphragm outer ring 12. The leaf seal 70 is disposed opposite to the tip shroud 51. The leaf seal 70 is a contact type seal that is capable of coming into contact with the tip shroud 51. The leaf seal 70 reduces a leakage rate of the steam S that flows from a high-pressure side to a low-pressure side.

Figure 3:
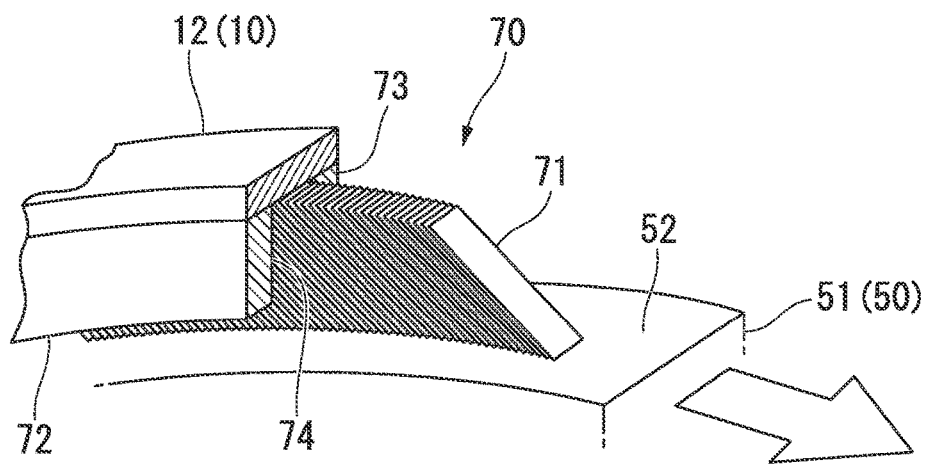
FIG. 3 is a perspective view showing a schematic constitution of a leaf seal of the steam turbine.

As shown in FIGS. 2 and 3, the leaf seal 70 is equipped with a seal body 71. The seal body 71 has flat thin plates, each of which has a predetermined width dimension in the axial direction. The flat thin plates are disposed in multiple layers in the circumferential direction of the tip shroud 51. Further, the seal body 71 is mounted on the diaphragm outer ring 12 such that an angle formed between each thin plate and an outer circumferential surface 52 of the moving blade 50 is an acute angle in a rotational direction of the tip shroud 51. The leaf seal 70 is in a contact with an outer circumferential surface 52 of the tip shroud 51 when the moving blades 50 are stopped. The leaf seal 70 is slightly raised from the tip shroud 51 when the moving blades 50 are tuned by the dynamic pressure effect of the steam S, and is not in contact with the outer circumferential surface 52 of the tip shroud 51.

The leaf seal 70 is equipped with a recess 74 that is defined by the aforementioned diaphragm outer ring 12, a low-pressure-side plate member 72 disposed at a low pressure side of the diaphragm outer ring 12, and a high-pressure-side plate member 73 disposed at the high pressure side as well. In the recess 74, a base of the seal body 71 which is adjacent to the diaphragm outer ring 12 is depressed, and a small tip portion of the seal body 71 which is adjacent to the tip shroud 51 is exposed outside the recess 74. That is, most of a high-pressure-side lateral surface of the seal body 71 is covered by the high-pressure-side plate member 73. Most of the low-pressure-side lateral surface of the seal body 71 is covered by the low-pressure-side plate member 72.

The diaphragm outer ring 12 of the casing 10 is provided with a recess 13 that is open toward a radial inner side. The tip shroud 51 of the moving blades 50 is disposed in the recess 13. Axial gaps K2 leading to the aforementioned radial gap K1 are formed between a pair of faces 12a and 12b that are opposite to each other in an axial direction of the recess 13, and a pair of faces 51a and 51b that are opposite to each other in the axial direction of the tip shroud 51. For this reason, a part of the steam S flowing to a main channel R directed from the stationary blades 40 toward the moving blades 50 goes around to a channel formed by the high-pressure-side axial gap K2 of the moving blades 50. The steam S going around to the axial gap K2 mainly moves toward the low pressure side with respect to the leaf seal 70 via a small gap formed between the seal body 71 and the outer circumferential surface of the tip shroud 51 when the steam turbine 1 is driven.

A seal fin 53 that protrudes toward the radial outer side is formed on the outer circumferential surface 52 of the tip shroud 51 at the high pressure side with respect to the leaf seal 70. The seal fin 53 is formed in an approximately annular shape extending in the circumferential direction of the tip shroud 51. The seal fin 53 is formed in such a manner that a radial height dimension is sufficiently greater than a gap dimension between the high-pressure-side plate member 73 and the tip shroud 51.

A honeycomb seal 80 is attached at a position at which the diaphragm outer ring 12 is opposite to the seal fin 53. The honeycomb seal 80 has a small gap from the seal fin 53 in the radial direction, and is open toward the seal fin 53, i.e., the radial inner side. The honeycomb seal 80 has a so-called honeycomb structure in which cylinders, each of which has a cross section of, for instance, an approximately hexagonal shape, are arranged in the axial and the circumferential directions without a gap. Due to such a honeycomb structure, the honeycomb seal 80 attenuates the dynamic pressure of the steam S coming into contact with openings of the honeycomb seal 80, inhibiting a gyration fraction (hereinafter referred to as a "swirl") directed in a gyrating direction (i.e., a circumferential direction) in a flow of the steam S at the high pressure side of the leaf seal 70. Further, the honeycomb seal 80 is formed in an annular shape having a predetermined width in the axial direction that runs along a bottom 12c of the recess 13 of the diaphragm outer ring 12. The seal fin 53 stands at the inner diameter side of the honeycomb seal 80.

Figure 4:
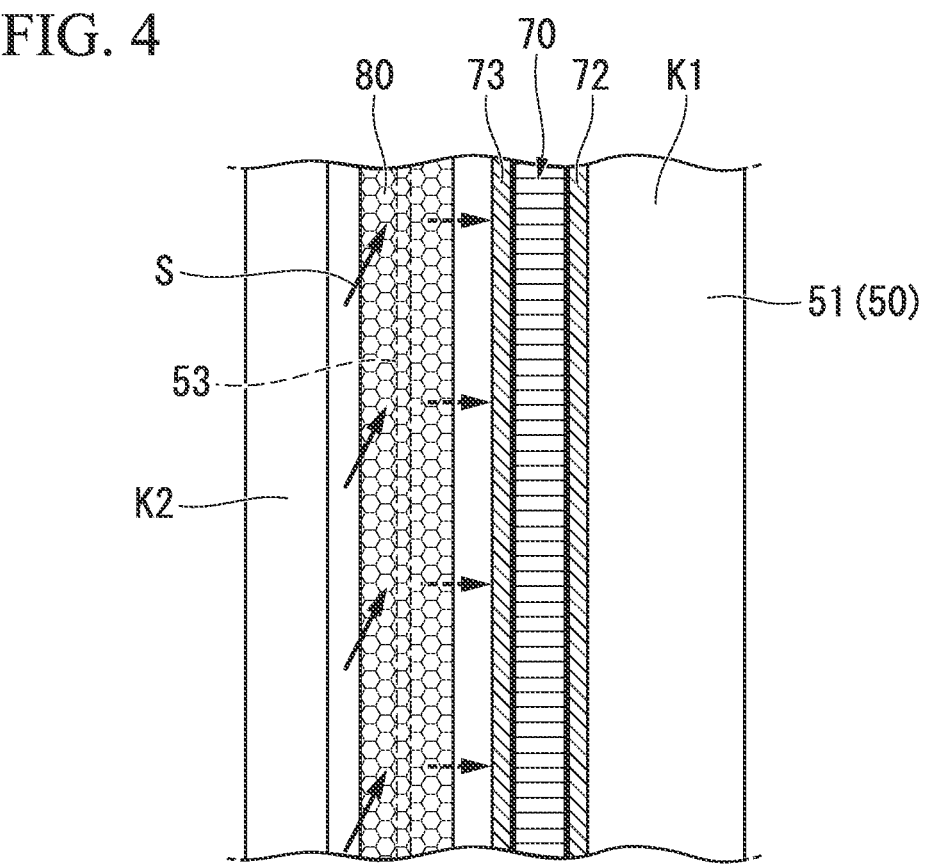
FIG. 4 is a view of the leaf seal when viewed from a radial outer side.

As shown in FIGS. 2 and 4, the steam S flowing in from the high-pressure-side axial gap K2 is guided toward the honeycomb seal 80 of the radial outer side by the seal fin 53, and comes into contact with the honeycomb seal 80. Many swirls directed in a direction inclined toward the extending direction of the leaf seal 70 are included in the steam S (indicated by an oblique arrow in FIG. 4). The steam S including such swirls comes into contact with the inner circumferential openings of the honeycomb seal 80, and thus the dynamic pressure thereof is attenuated. The steam S whose dynamic pressure is attenuated becomes a flow perpendicular to the high-pressure-side plate member 73 of the leaf seal 70, and comes into contact with the leaf seal 70. Subsequently, the steam S flows through the small gap between the seal body 71 and the tip shroud 51 in the axial direction. Afterwards, the steam S flows through the radial and axial gaps K1 and K2 at the low pressure side with respect to the leaf seal 70, and joins the steam S of the main channel.

Thus, according to the steam turbine of the aforementioned first embodiment, even when the leaf seal 70 is provided downstream from the stationary blades 40 generating the strong swirls, the dynamic pressure of the steam S flowing through the radial gap K1 in the circumferential direction is attenuated by the honeycomb seal 80 before the steam S reaches the high-pressure-side plate member 73 of the leaf seal 70, and the swirls included in the steam S can be inhibited. For this reason, it is possible to reduce the swirls colliding with the high-pressure-side plate member 73 or the swirls passing through the seal body 71. As a result, the constituent members of the leaf seal 70, such as the high-pressure-side plate member 73 and the seal body 71 can be prevented from being damaged while the leakage rate of the steam S is reduced using the leaf seal 70 that is the contact type seal.

Further, the steam S flowing into the radial gap K1 is led to the honeycomb seal 80 by the seal fin 53, and thereby the swirls can be prevented from coming into contact with the high-pressure-side plate member 73 without going through the honeycomb seal 80. As a result, it is possible to improve an effect of suppressing the swirls due to the honeycomb seal 80.

Next, a steam turbine that is a rotary machine in a second embodiment of this invention will be described based on the drawings. In the steam turbine of the second embodiment, since the aforementioned honeycomb seal 80 is replaced with swirl flow attenuating deflection plates 180, the same portions will be described with the same numerals given, and a repetitive description thereof will be omitted.

Figure 5:
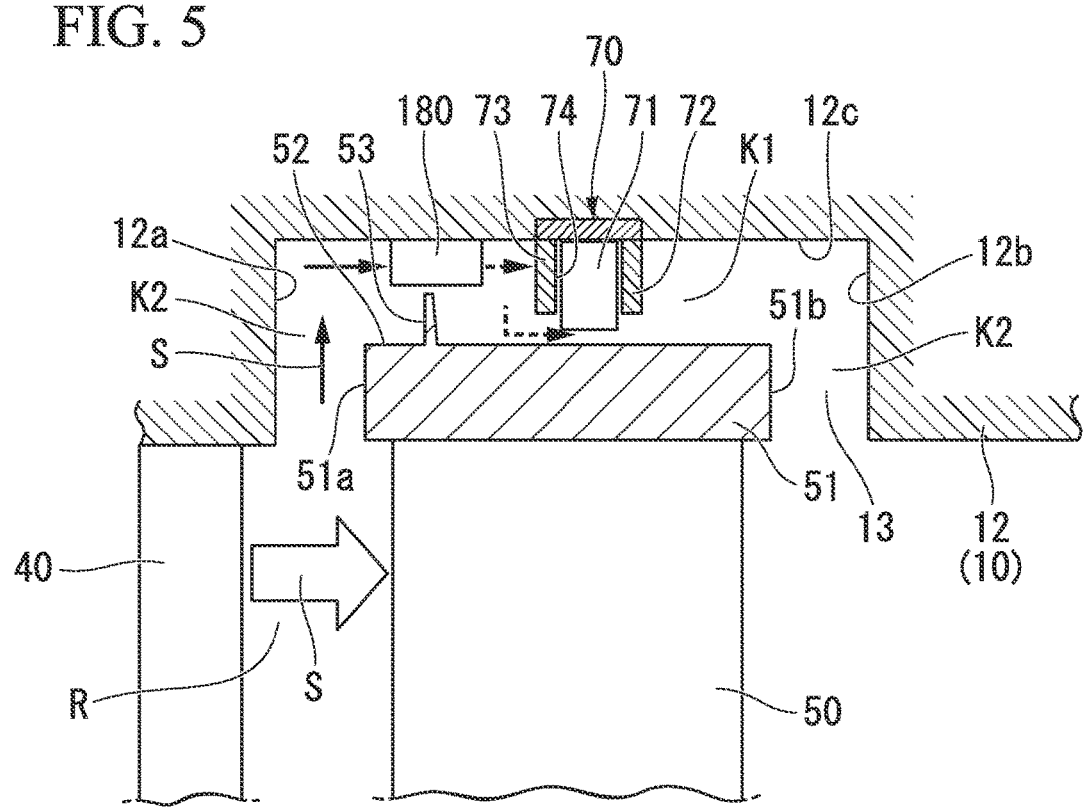
FIG. 5 is a schematic constitutional view corresponding to FIG. 2 in a second embodiment of the invention.
Figure 6:
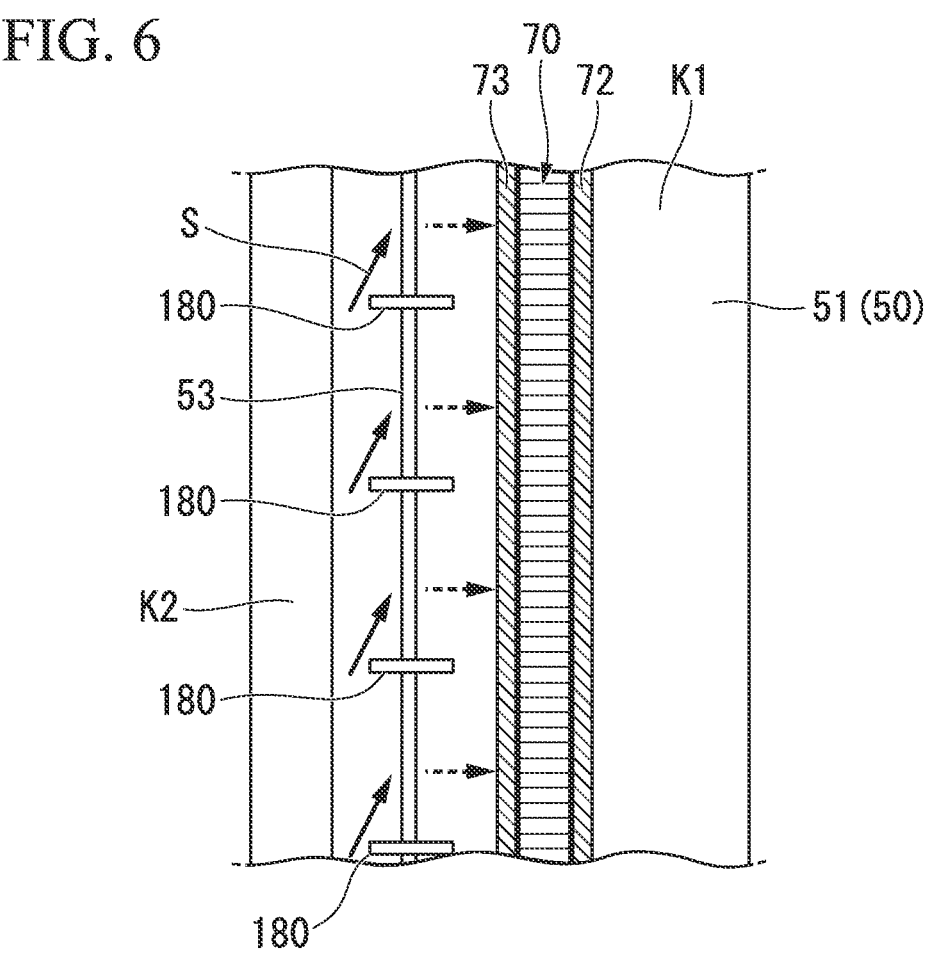
FIG. 6 is a view corresponding to FIG. 4 in the second embodiment of the invention.

As shown in FIGS. 5 and 6, like the aforementioned first embodiment, the outer circumferential surface 52 of the tip shroud 51 is provided with the seal fin 53 that protrudes toward the radial outer side at the high pressure side with respect to the leaf seal 70.

The multiple swirl flow attenuating deflection plates 180 are attached at the position opposite to the seal fin 53 of the diaphragm outer ring 12. A small gap is radially formed between the swirl flow attenuating deflection plates 180 and the seal fin 53. These swirl flow attenuating deflection plates 180 are formed in rectangular plate shapes extending in the radial and the axial directions. The multiple swirl flow attenuating deflection plates 180 are arranged at predetermined intervals in the circumferential direction. Each swirl flow attenuating deflection plate 180 inhibits swirls of the steam S at the high pressure side of the leaf seal 70 by changing a direction in which the steam S passing between these swirl flow attenuating deflection plates 180 moves to follow the swirl flow attenuating deflection plates 180. An interval between the swirl flow attenuating deflection plates 180 may sufficiently change the direction in which the steam S moves (which also applies equally to swirl flow attenuating deflection plates 280 of a third embodiment below).

The swirl flow attenuating deflection plates 180 have a predetermined length in the axial direction running along the bottom 12c of the recess 13 of the diaphragm outer ring 12. The seal fin 53 is disposed at the inner diameter side of these swirl flow attenuating deflection plates 180. An example in which an angle of each swirl flow attenuating deflection plate 180 is perpendicular to a direction in which the leaf seal 70 extends is shown in FIG. 6. However, the angle of each swirl flow attenuating deflection plate 180 is not limited to such an angle as long as it can inhibit the swirls (which also applies equally to the third embodiment below).

Thus, according to the steam turbine of the aforementioned second embodiment, it is possible to change the direction of the steam S into a direction different from a swirling direction. As such, similar to the first embodiment, it is possible to inhibit the swirls included in the steam S flowing through the radial gap K1 in the circumferential direction before the steam S reaches the high-pressure-side plate member 73 of the leaf seal 70. That is, it is possible to reduce the swirls colliding with the high-pressure-side plate member 73 or the swirls passing through the seal body 71. As a result, the high-pressure-side plate member 73 of the leaf seal 70 can be prevented from being damaged while the leakage rate of the steam S is reduced.

Further, since the swirls can be prevented from coming into contact with the high-pressure-side plate member 73 of the leaf seal 70 by the seal fin 53 without going through the swirl flow attenuating deflection plates 180, it is possible to improve the effect of suppressing the swirls due to the swirl flow attenuating deflection plates 180.

Next, a steam turbine that is a rotary machine in a third embodiment of this invention will be described based on the drawings. In the steam turbine in the third embodiment, arrangement of the aforementioned swirl flow attenuating deflection plates and a height of the seal fin are changed, the same portions will be described with the same numerals given, and a repetitive description thereof will be omitted.

Figure 7:
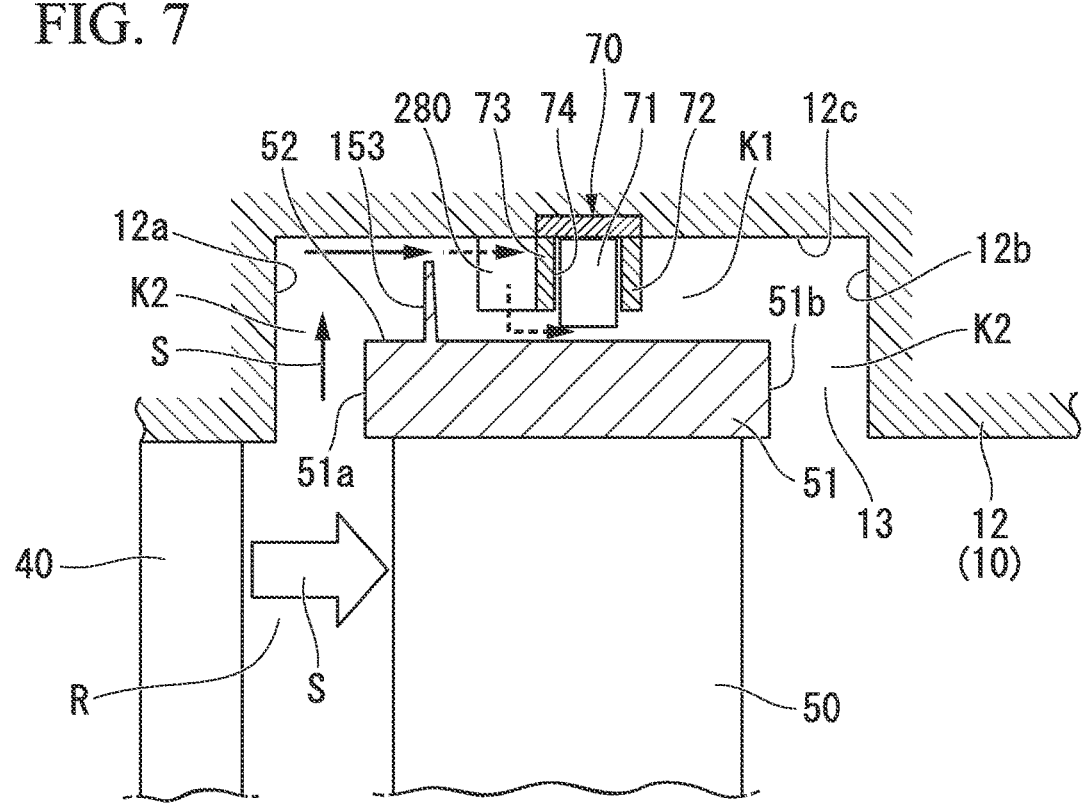
FIG. 7 is a schematic constitutional view corresponding to FIG. 2 in a third embodiment of the invention.
Figure 8:
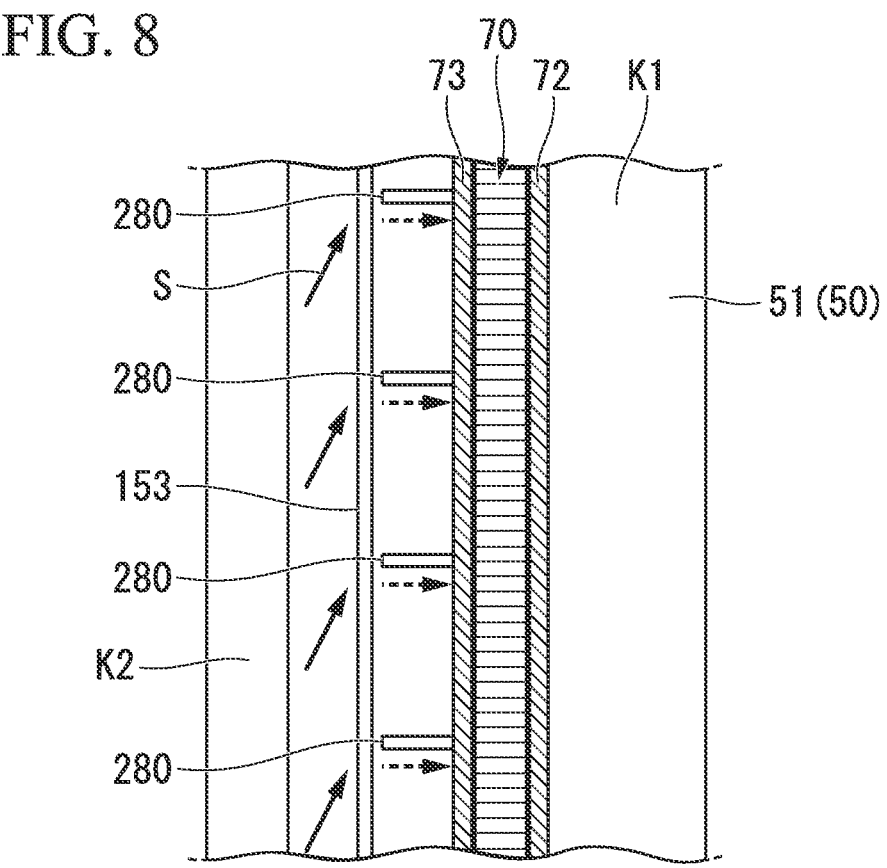
FIG. 8 is a view corresponding to FIG. 4 in the third embodiment of the invention.

As shown in FIGS. 7 and 8, a seal fin 153 protruding toward the radial outer side is formed on the outer circumferential surface of a tip shroud 51 which is at the high pressure side with respect to the leaf seal 70. The seal fin 153 is formed in an approximately annular shape extending in the circumferential direction of the tip shroud 51. A small gap is formed between the radial outer end edge of the seal fin 153 and the bottom 12c of the recess 13 of the diaphragm outer ring 12.

On the other hand, multiple swirl flow attenuating deflection plates 280 are attached to the inner circumferential surface of the diaphragm outer ring 12 in the vicinity of the leaf seal 70 between the leaf seal 70 and the seal fin 153. These swirl flow attenuating deflection plates 280 are formed in rectangular plate shapes extending in the radial and the axial directions. The multiple swirl flow attenuating deflection plates 280 are arranged at predetermined intervals in the circumferential direction.

Similar to the swirl flow attenuating deflection plates 180 of the aforementioned second embodiment, each swirl flow attenuating deflection plate 280 changes a direction in which steam S passing between the multiple swirl flow attenuating deflection plates 280 moves so as to run along the swirl flow attenuating deflection plates 280, thereby inhibiting swirls of the steam S at the high pressure side of the leaf seal 70. The swirl flow attenuating deflection plates 280 have a predetermined length in the axial direction running along the inner circumferential surface of the diaphragm outer ring 12, and have a length dimension that is approximately the same as the length dimension of the high-pressure-side plate member 73 of the leaf seal 70 in the radial direction. This embodiment is an example in which the swirl flow attenuating deflection plates 280 have the length dimension that is approximately the same as the length dimension of the high-pressure-side plate member 73 of the leaf seal 70. However, the length dimension of the swirl flow attenuating deflection plates may be set to allow most of the steam S flowing through the radial outer gap of the seal fin 153 to pass between the swirl flow attenuating deflection plates 280, and may be properly set depending on the size of the gap between the seal fin 153 and the bottom 12c.

Thus, according to the steam turbine of the aforementioned third embodiment, similar to the aforementioned second embodiment, it is possible to change the direction of the steam S to a direction different from a swirling direction. As such, it is possible to inhibit the swirls included in the steam S flowing through the radial gap K1 in the circumferential direction before the steam S reaches the high-pressure-side plate member 73 of the leaf seal 70. That is, it is possible to reduce the swirls colliding with the high-pressure-side plate member 73 or the swirls passing through the seal body 71. As a result, the high-pressure-side plate member 73 of the leaf seal 70 can be prevented from being damaged while the leakage rate of the steam S is reduced.

Further, the swirls can be prevented from coming into contact with the high-pressure-side plate member 73 by the seal fin 153 without going through the swirl flow attenuating deflection plates 280. As such, it is possible to improve the effect of suppressing the swirls due to the swirl flow attenuating deflection plates 280.

Next, a steam turbine that is a rotary machine in a fourth embodiment of this invention will be described based on the drawings. In the steam turbine in the fourth embodiment, the seal fin 153 of the third embodiment is omitted. As such, the same portions will be described with the same numerals given, and a repetitive description thereof will be omitted.

Figure 9:
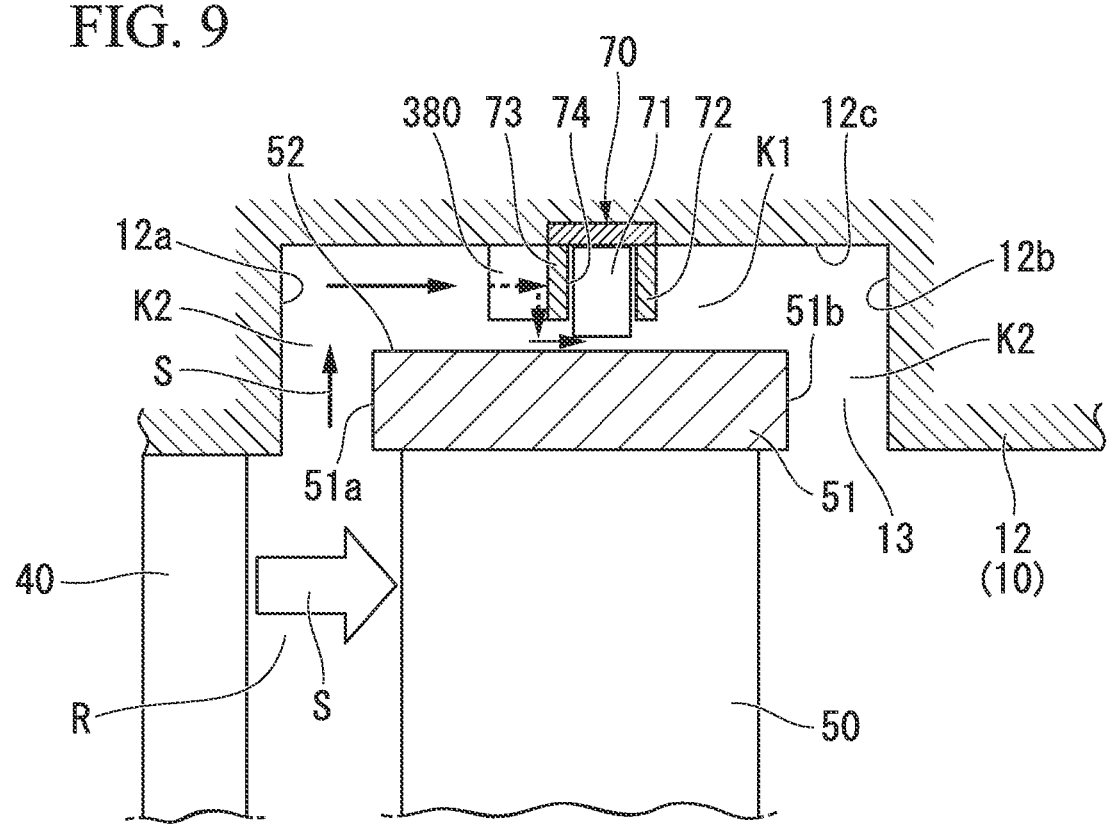
FIG. 9 is a schematic constitutional view corresponding to FIG. 2 in a fourth embodiment of the invention.
Figure 10:
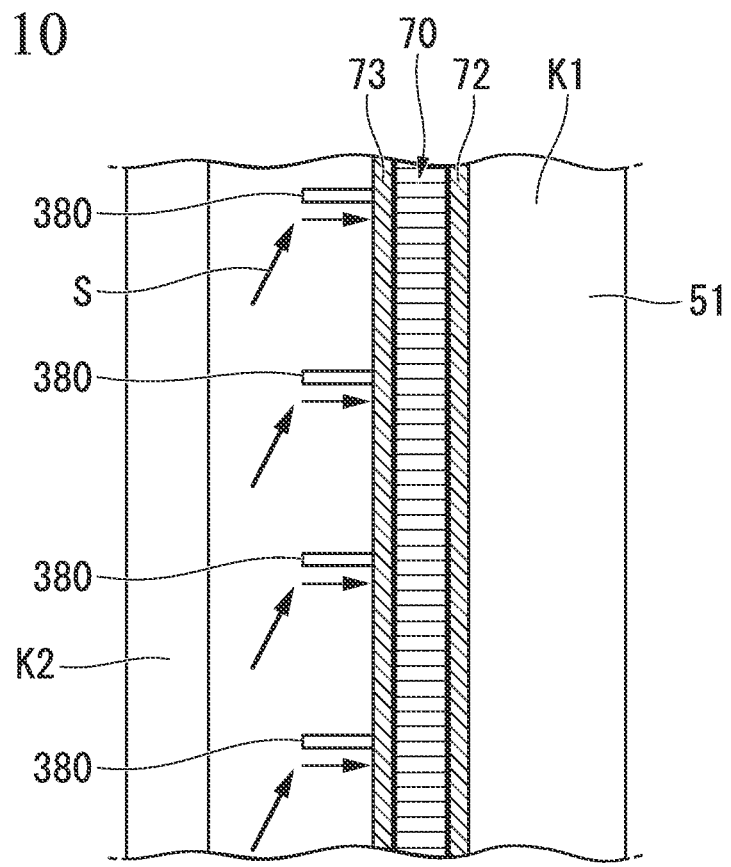
FIG. 10 is a view corresponding to FIG. 4 in the fourth embodiment of the invention.

As shown in FIGS. 9 and 10, in the steam turbine of this embodiment, a structure such as the protrusion that changes the flow of steam S of the radial gap K1 is not formed on an outer circumferential surface of the tip shroud 51 which is at the high pressure side with respect to the leaf seal 70.

Multiple swirl flow attenuating deflection plates 380 are attached to the inner circumferential surface of the diaphragm outer ring 12 at the high pressure side with respect to the leaf seal 70, and in the vicinity of the leaf seal 70. Like the swirl flow attenuating deflection plates 280 of the aforementioned third embodiment, these swirl flow attenuating deflection plates 380 are formed in rectangular plate shapes extending in the radial and the axial directions. The multiple swirl flow attenuating deflection plates 380 are arranged at predetermined intervals in the circumferential direction.

These swirl flow attenuating deflection plates 380 change a direction in which the steam S passing between the multiple swirl flow attenuating deflection plates 380 moves so as to follow the swirl flow attenuating deflection plates 380, thereby inhibiting swirls of the steam S at the high pressure side of the leaf seal 70. The swirl flow attenuating deflection plates 380 have a predetermined length in the axial direction running along the inner circumferential surface of the diaphragm outer ring 12, and have the same length dimension as the high-pressure-side plate member 73 of the leaf seal 70 in the radial direction.

Thus, according to the steam turbine of the aforementioned fourth embodiment, since the swirl flow attenuating deflection plates 380 have the same length dimension as the high-pressure-side plate member 73 of the leaf seal 70 in the radial direction, even when no seal fin 153 is disposed at the high pressure side of the swirl flow attenuating deflection plates 380, most of the steam S colliding with the leaf seal 70 collides therewith after going through the swirl flow attenuating deflection plates 380. For this reason, it is possible to reduce swirls of the steam S colliding with the leaf seal 70, and to prevent constituent members of the leaf seal 70 such as the high-pressure-side plate member 73 and the seal body 71 from being damaged due to the swirls.

Next, a steam turbine that is a rotary machine in a fifth embodiment of this invention will be described based on the drawings. In the steam turbine in the fifth embodiment, the constitution of the swirl flow inhibitor of each of the embodiments is changed. Therefore, the same portions will be described with the same numerals given, and a repetitive description thereof will be omitted.

Figure 11:
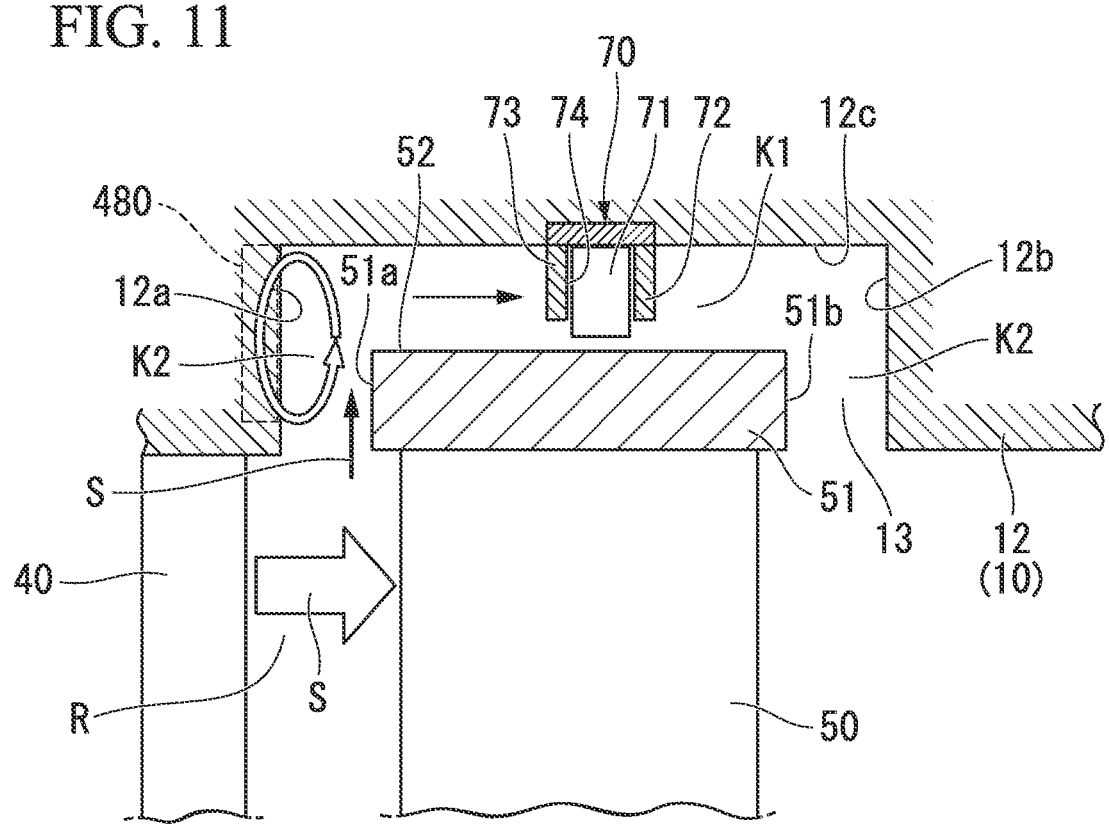
FIG. 11 is a schematic constitutional view corresponding to FIG. 2 in a fifth embodiment of the invention.
Figure 12:
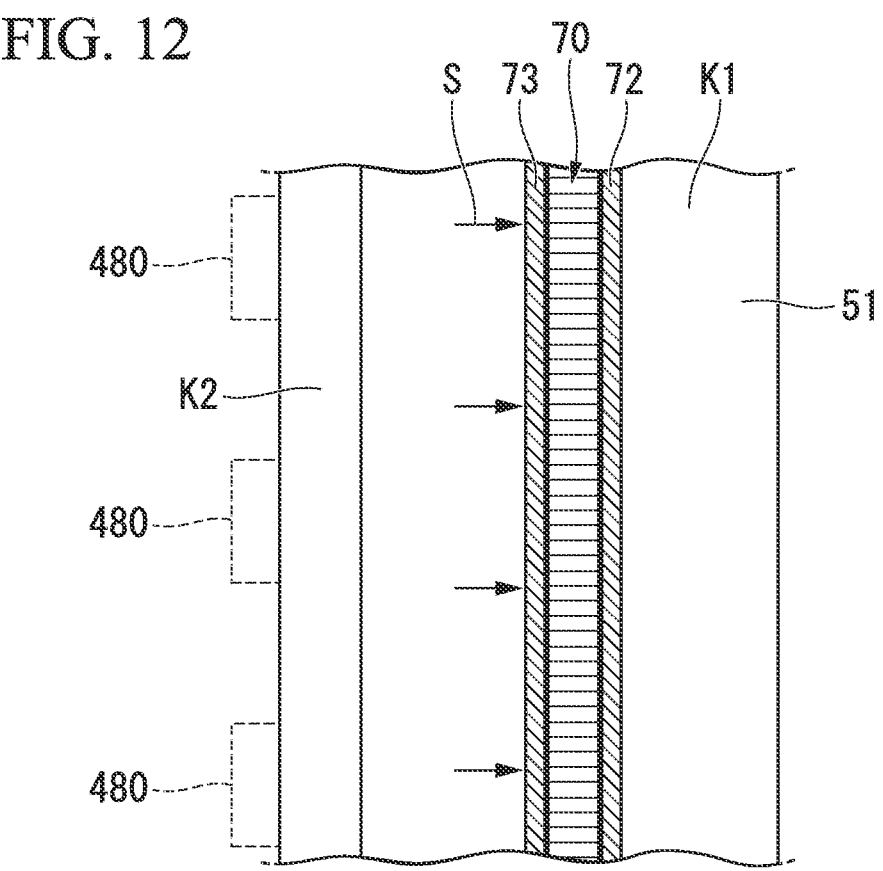
FIG. 12 is a view corresponding to FIG. 4 in the fifth embodiment of the invention.

As shown in FIGS. 11 and 12, in the steam turbine of this embodiment, swirl flow inhibiting recesses 480, which inhibit the swirl flow formed in the depthwise direction of each of which is the aforementioned axial direction, are formed in both sides in the axis direction of a diaphragm outer ring 12. The swirl flow inhibiting recesses 480 have a predetermined width in a circumferential direction, and are formed at predetermined intervals in the circumferential direction. The swirl flow inhibiting recesses 480 partly and sharply enlarge the channel area of the axial gap K2, and thus make it possible to generate vortexes indicated by an arrow in FIG. 11 from the steam S flowing through the axial gap K2.

Thus, according to the steam turbine of the aforementioned fifth embodiment, the channel area is partly enlarged by the swirl flow inhibiting recesses 480. Thereby, the vortexes can be generated from the steam S, and thus the swirls can be counteracted by the vortexes. As a result, it is possible to prevent constituent members of the leaf seal 70 such as the high-pressure-side plate member 73 and the seal body 71 from being damaged due to the swirls.

Figure 13:
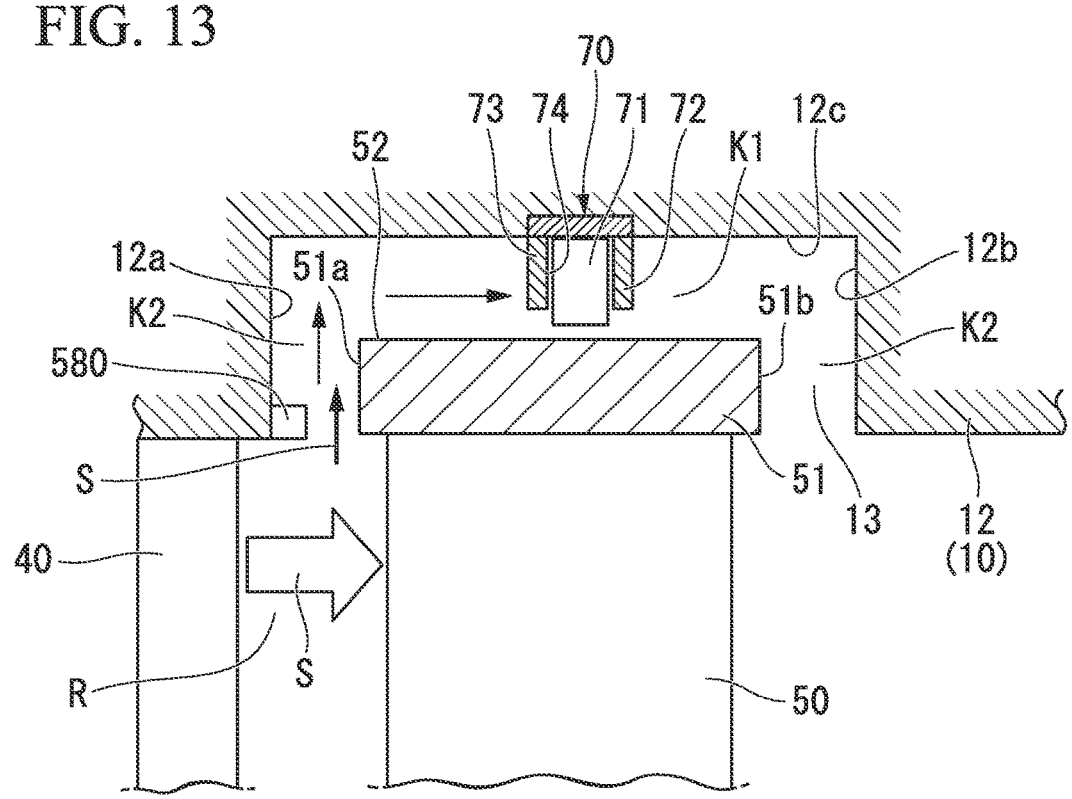
FIG. 13 is a view corresponding to FIG. 2 in a modification of the fifth embodiment of the invention.
Figure 14:
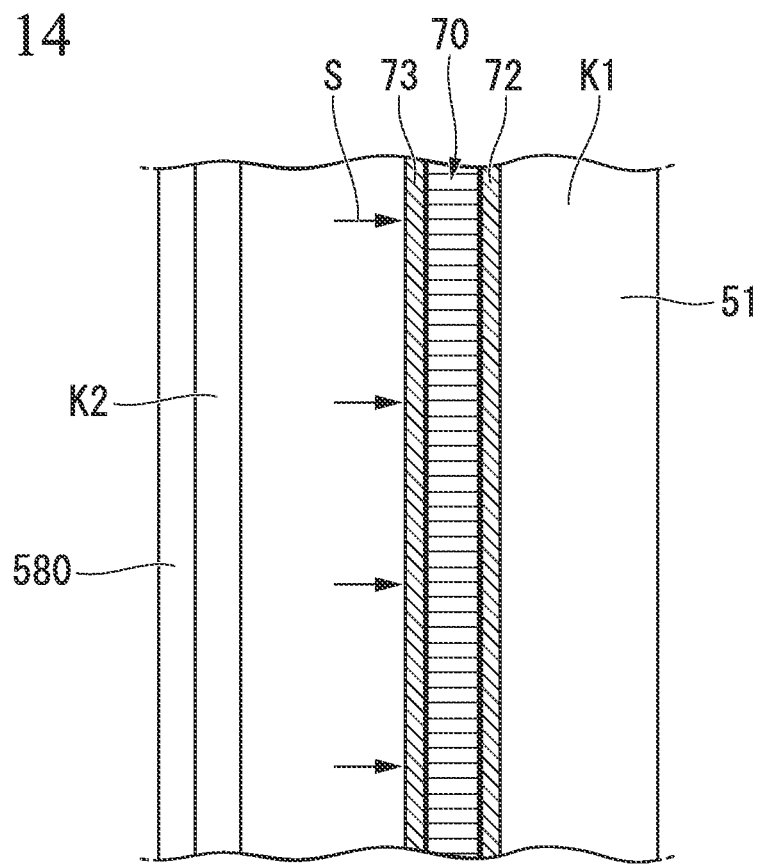
FIG. 14 is a schematic constitutional view corresponding to FIG. 4 in the modification of the fifth embodiment of the invention.

Here, as a modification of the fifth embodiment, as shown in FIGS. 13 and 14, a swirl flow inhibiting protrusion 580 that partly narrows and reduces the channel area of the axial gap K2 may be provided in both sides in the axis direction of the diaphragm outer ring 12 at the radial innermost positions. In this case, the swirl flow inhibiting protrusion 580 can partly and sharply change the channel area of the axial gap K2, and thus reduce the dynamic pressure of the steam S flowing through the axial gap K2 and the swirls. The swirl flow inhibiting protrusion 580 of the modification is used in combination with the aforementioned swirl flow inhibiting recesses 480, and thereby the swirls can be further reduced.

Next, a steam turbine that is a rotary machine in a sixth embodiment of this invention will be described based on the drawings. In the steam turbine in the sixth embodiment, the constitution of the swirl flow inhibitor of each of the embodiments is changed. Therefore, the same portions will be described with the same numerals given, and a repetitive description thereof will be omitted.

As shown in FIG. 15, in the steam turbine of this embodiment, the bottom 12c of the diaphragm outer ring 12 which faces a radial inner side is equipped with an inlet 681 that opens upstream from swirls. The inlet 681 is disposed at a high pressure side of the leaf seal 70 apart from the leaf seal 70 in an axial direction. The inlet 681 is connected to an expansion chamber 682 formed in the diaphragm outer ring 12 via an intake passage 683. That is, the expansion chamber 682, the axial gap K2, and the radial gap K1 communicate with the inlet 681 and the intake passage 683.

The bottom 12c of the diaphragm outer ring 12 is provided with an outlet (not shown) facing the radial inner side in the vicinity of the leaf seal 70. The outlet is connected to the expansion chamber 682 via an exhaust passage 684. That is, the expansion chamber 682 and the radial gap K1 communicate with each other via the outlet and the exhaust passage 684. One swirl flow inhibitor 680 of this embodiment is formed by the inlet 681, the intake passage 683, the expansion chamber 682, the exhaust passage 684, and the outlet. The multiple swirl flow inhibitors 680 are arranged at predetermined intervals in the circumferential direction.

For example, when the steams S including the swirls flows into the high-pressure-side axial gap K2, the swirls are recovered from the inlet 681 into the expansion chamber 682 in the course of flowing from the axial gap K2 to the radial gap K1 using the dynamic pressure thereof. The steam S recovered into the expansion chamber 682 is subjected to a decrease in the dynamic pressure, becomes a flow that is sequentially directed to the radial inner side from the exhaust passage 684 via the outlet by a static pressure thereof, and is adapted to be injected in the vicinity of the leaf seal 70.

Thus, according to the steam turbine of the aforementioned sixth embodiment, after a swirl fraction included in the steam S is recovered and stored in the expansion chamber 682, the recovered steam S can be injected in the vicinity of the high pressure side of the leaf seal 70 using the static pressure thereof. For this reason, the swirls can be changed into the flow directed to the radial inner side different from a swirling direction. Further, a so-called air curtain flowing toward the radial inner side is formed at the high pressure side of the leaf seal 70 by the steam S injected toward the radial inner side. For this reason, the swirls that can be recovered by the swirl flow inhibitor 680 can be prevented from colliding from the high pressure side of the leaf seal 70. As a result, it is possible to prevent constituent members of the leaf seal 70 such as the high-pressure-side plate member 73 and the seal body 71 from being damaged due to the swirls.

This invention is not limited to the constitution of each of the aforementioned embodiments, and can be changed in design without departing from the gist thereof.

For example, in each of the aforementioned embodiments, the steam turbine has been described as the rotary machine by way of example, but the rotary machine is not limited to the steam turbine. The rotary machine of this invention may be a rotary machine which is provided between a stator that is a stationary body and a rotor that is a rotating body and in which swirls collide with the leaf seal 70 sealing a space between a high pressure and a low pressure, and may be applied to, for instance, a gas turbine or a compressor.

Further, in each of the aforementioned embodiments, the leaf seal 70 has been described as the contact type seal by way of example. The contact type seal of this invention is not limited to the leaf seal 70. For example, this invention may be applied to a rotary machine that employs a brush seal that is in contact with the rotor side at all times. In this case, constituent members such as a high-pressure side wall surface of a holder holding the brush seal and a brush that is a seal body can be inhibited from being damaged.

Further, in each of the aforementioned embodiments, an example in which the steam S is used as the working fluid has been described. The working fluid is not limited to the steam S as long as the swirls can be generated.

Furthermore, a place at which strong swirls occur has been described as the downstream side from each stationary blade 40 by way of example, but may be the downstream side of a nozzle.

This invention can be widely applied to rotary machines such as a steam turbine equipped with a contact type seal mechanism.

REFERENCE SIGNS LIST

- 50: moving blade (rotor)
- 10: casing (stator)
- 71: seal body
- 73: high-pressure-side plate member
- 70: leaf seal (contact type seal)
- 80: honeycomb seal (swirl flow inhibitor)
- 53, 153: seal fin (protrusion)
- 180, 280, 380: swirl flow attenuating deflection plate (swirl flow inhibitor)
- 480: swirl flow inhibiting recess (recess, swirl flow inhibitor)
- 580: swirl flow inhibiting protrusion (protrusion, swirl flow inhibitor)
- 680: swirl flow inhibitor
- S: steam (working fluid)

What is claimed is:

1. A rotary machine comprising:

a rotor;

a stator configured to cover the rotor so as to define a gap at an outer circumferential side of the rotor;

a contact type seal configured to have a seal body, which is disposed in the gap so as to protrude radially inward from the stator and is capable of coming into contact with the rotor, and a high-pressure-side plate member disposed along a face facing a high pressure side of the seal body; and a swirl flow inhibitor provided at the high pressure side of the contact type seal in the gap and configured to suppress a swirl flow of working fluid flowing through the gap in a circumferential direction, wherein the swirl flow inhibitor comprises a deflection plate configured to change a direction of the swirl flow in the stator, wherein the deflection plate is a flat plate that extends in an axial direction of the rotor, wherein the flat plate includes a first end and a second end, the first end is located on an upstream side in a flow direction of the working fluid, and the second end is located on a downstream side in a flow direction of the working fluid, and wherein a connecting line between the first end and the second end is in parallel with the axial direction of the rotor.

2. The rotary machine according to claim 1, wherein the rotor comprises a protrusion that guides the swirl flow into the gap of the high pressure side of the contact type seal such that the swirl flow comes into contact with the swirl flow inhibitor.

3. The rotary machine according to claim 1, wherein the swirl flow inhibitor is disposed near the high-pressure-side plate member.

4. The rotary machine according to claim 1, wherein the swirl flow inhibitor comprises a recess that partly enlarges a high-pressure-side channel area of the contact type seal.

5. The rotary machine according to claim 1, wherein the swirl flow inhibitor comprises a protrusion that partly narrows a high-pressure-side channel area of the contact type seal.

6. The rotary machine according to claim 1, wherein the swirl flow inhibitor comprises an expansion chamber that recovers the swirl flow to reduce a dynamic pressure of the swirl flow, and the expansion chamber injects the recovered working fluid to the vicinity of the high pressure side of the contact type seal using a static pressure of the working fluid.

\* \* \* \* \*